Patented Sept. 16, 1941

2,255,778

UNITED STATES PATENT OFFICE 2,255,778

PROCESS FOR PRODUCING VAT DYESTUFF PRINTS

Eduard Kambli, Basel, Ernst Stoecklin, Binningen, and Richard Tobler, Riehen, Switzerland, assignors to the firm of Society of Chemical Industry in Basle, Basel, Switzerland No Drawing. Application December 5, 1938, Serial No. 244,131. In Switzerland December 7, 1937

8 Claims. (Cl. 8—70)

This invention relates to an improved process for printing textile products, for instance fibres containing cellulose and also animal fibres (cotton, artificial silk, wool, silk), wherein there is used for the printing a compound resembling a quinhydrone prepared from a vat dyestuff. In a special form of the process the quinhydrone-like vat dyestuff derivative is produced as a constituent of the printing paste or the like before the printing operation.

Quinhydrone-like compounds or derivatives of vat dyestuffs are compounds in which a leuco-compound of a vat dyestuff and a vat dyestuff are united in manner similar to that in which hydroquinone and quinone are united in quinhydrone. Such quinhydrone-like vat dyestuff derivatives may be in the simplest case a molecular union between 1 mol of a vat dyestuff and 1 mol of the leuco-compound of the same vat dyestuff. However, there also come into question molecular compounds between a vat dyestuff and a leuco-compound of another vat dyestuff, preferably belonging to the same group.

The quinhydrone-like derivatives of vat dyestuffs may be made analogously to the known simple quinhydrones, that is to say for example a vat dyestuff may be caused to act upon the leuco-compound of the dyestuff or of another vat dyestuff or sometimes a vat dyestuff may be partially reduced or a leuco-vat dyestuff partially oxidized. Both indigoid and anthraquinoid vat dyestuffs are suitable for conversion into quinhydrone-like compounds. Among the bis-indol-indigoid, indol-thionaphthene-indigoid, bis-thionaphthene-indigoid and naphthalene-indol-indigoid dystuffs those are especially suitable which contain at least one substituent.

Also in the case of anthraquinone vat dyestuffs those which contain a substituent such as halogen-, methoxy-, amino- and substituted amino-groups and/or more highly condensed ring systems may advantageously be used for making quinhydrones. There also come into question dyestuffs which, besides the anthraquinone nucleus which lends capacity for being vatted or besides a more highly condensed, if desired heterocyclic ring system having the same function, contain also fused-on carbazole or other 5-membered rings or acridone rings as well as other heterocyclic configurations.

From these dyestuffs quinhydrones may be made for example by causing the dyestuff to act on its leuco-compound. In many cases the dyestuff may be partially reduced, that is to say there may be used a proportion of a reducing agent insufficient for complete reduction or the operation may be under such conditions that full reduction does not occur. This mode of working affords an especially simple mode of producing the quinhydrone-like compound as a constituent in the printing paste. The operation may be conducted with advantage in an aqueous medium in which, by maintaining alkaline, for instance caustic alkaline, reaction, the leuco-compound of the vat dyestuff is soluble and able to act especially freely on the vat dyestuff suspended in the solution preferably in a finely subdivided state. The occurrence of a reaction is generally shown by a change of color, since the quinhydrones are colored differently from the corresponding dyestuffs and leuco-compounds, just as benzoquinone and hydroquinone are of different color from that of the quinhydrone produced from them.

In making the quinhydrones it is frequently necessary to adjust the temperature of the reaction and the hydrogen ion concentration of the reaction medium in suitable relationship to each other, since with the various vat dyestuffs the optimum conditions for quinhydrous production differ considerably from each other. As a rule the operation may be conducted at a raised temperature, for example about 40–80° C., that is to say at a temperature such as is normally used for the complete vatting of the dyestuff. In many cases, however, lower temperatures, about room temperature, or higher, for instance above 100° C. when the solvent is non-aqueous, may advantageously be used. In most cases aqueous alkaline media, for instance a solution of alkali hydroxide, are to be recommended for use; the concentration may be higher or lower than that usual for vatting. Alkali carbonate and alkali sulfide, as well as ammonia and organic bases, for instance alkylamines or alkanolamines, may also be used as alkaline agents. It is also possible to operate in organic solvents, for instance alcohol with or without addition of water and in the presence or absence of an alkaline agent. This is especially advantageous when, as in the case of non-substituted thio-indigo, the quinhydrone is split up by alkalis into its components and therefore cannot be produced in the presence of alkalis.

In many cases there is obtained not only the quinhydrone which contains a single dyesutff obtainable by uniting a vat dyestuff with its leuco-compound but also mixed quinhydrones by uniting a vat dyestuff with the leuco-compound of another vat dyestuff, this being especially the case when both vat dyestuffs have a similar capacity for reduction. When an unsuitable choice of vat dyestuff has been made or of conditions of reaction, either no reaction ensues or there is a re-vatting, since the leuco-compound of the one dyestuff reduces the other dyestuff to its leuco-compound and is itself thereby oxidized to dyestuff. On the other hand, in the case of many dyestuffs, especially those belonging to the same group of dyestuffs and having a molecular weight not substantially different, for instance differing only by about 50 units or less, the production of mixed quinhydrones is possible under the same conditions which are required when a quinhydrone containing only one dyestuff is to be made. As examples may be here cited 6:6'-diethoxy-thio-indigo, 4:4'-dimethyl-6:6'-dichloro-thio-indigo and 4:5:4':5'-dibenzo-thio-indigo.

Such quinhydrone-like derivatives of vat dyestuffs have generally a fine crystalline form and require for complete vatting a smaller proportion of hydrosulfite than the same quantity of the fundamental unvatted dyestuff requires. They are generally insoluble in water and organic solvents, but decompose in aqueous media especially in alkaline reaction on long standing at room temperature or on heating and preferably with access of air, the original dyestuff being reformed and frequently precipitated in extremely fine state of division.

Good results are also obtained when the quinhydrone which in most cases still contains in part chemically combined alkali, is caused to react with an acid. For this purpose the filtered product, if desired purified by washing, may be used, or the reaction mixture produced in the production of the quinhydrone. Suitable acids are the usual mineral acids, for instance, hydrochloric or sulfuric acid. These may be wholly or in part substituted with advantage by acids, the salts of which have hydrotropic properties.

The neutralized or acidified quinhydrones thus obtained are characterized by an enhanced stability to atmospheric oxygen and may on this ground be freely handled in many cases. The hydrotropic agent which may be produced simultaneously with the neutralization has a favourable effect on printing.

Further information respecting manufacture of the quinhydrones useful in the present invention may be gathered from application Serial No. 244,130, filed December 5, 1938.

This invention, in which such quinhydrone derivatives of vat dyestuffs are used for printing, may be applied in the case of all kinds of textile printing on fabrics, yarns or similar material, for instance in mordant printing or direct printing. Printing follows the usual methods for use with vat dyestuffs.

The quinhydrone-like vat dyestuff derivatives may be used in the form of powder or an aqueous paste and indeed in many cases the reaction mixture may be used in the form which is obtained by the above described procedures. In order to make the vat dyestuff derivatives especially suitable for printing there may be added, even when such agents have already taken part in their manufacture, the various hydrotropic agents used in the generally known methods of printing or such agents may be incorporated in the printing paste. With such an agent as an assistant the printing yield is increased, the increase being greater than the increase attained by the addition of the same agent to such printing pastes which instead of the quinhydrone-like vat dyestuff contain the vat dyestuff itself. Furthermore, reduction catalysts, fluxing agents, diluents, bactericides, alkali-compounds, heavy metal salts, dust preventing agents or the like may be added by mixing or grinding; such agents are generally known.

In many cases conversion products of quinhydrone-like vat dyestuff derivatives may be used with advantage for printing, namely those which are obtained by the action of an oxidizing agent, for instance air, preferably in an aqueous medium.

The dyestuff derivatives or vat dyestuff preparations are very rapidly fixed. They afford very penetrative, pure and fast prints.

The following examples illustrate the invention, the parts being by weight:

Example 1

384 parts of 6:6'-diethoxy-thio-indigo and 386 parts of a leuco-compound of 6:6'-diethoxy-thio-indigo made in the usual manner are stirred together with 3200 parts of water and 1000 parts of caustic soda lye of 30 per cent strength to produce a uniform magma which is then heated while stirring well at 75° C. and suspended at this temperature until the original orange paste has become a fine crystalline brown-black magma. When the reaction is complete, the mass is cooled at ordinary temperature and mixed with 630 parts of sodium toluenesulfonate and 1050 parts of glycerine and then ground with water to make up a total weight of 7700 parts.

220 parts of this paste are stirred to form a paste together with

| | Parts |
|---|---|
| Cold potash thickening made by boiling for ½ hour | 600 |
| Wheat starch | 110 |
| Water | 170 |
| Tragacanth (60:1000) | 250 |
| British gum | 200 |
| Potash | 170 |
| Glycerine | 100 |
| Total weight | 1000 | there being also added 100 parts of sodium formaldehyde sulfoxylate and 80 parts of water. This printing color, after being allowed to stand for a short or a long time, is printed on cotton which is then dried, steamed for 5 minutes in an air-free Mather-Platt apparatus at 102° C., washed and soaped at the boil. There is obtained a strong and pure orange print.

Example 2

384 parts of 6:6'-diethoxy-thio-indigo and 386 parts of a leuco-compound of 6:6'-diethoxy-thio-indigo, obtained in the usual way, are stirred with 3200 parts of water and 1000 parts of caustic soda lye of 30 per cent strength to form a uniform magma which is then, while stirring well at 75° C., at which temperature it is maintained until the originally orange paste has become a finely crystalline brown-black magma; this is the case after about 30 minutes. When reaction is complete, the mass is cooled to an ordinary temperature and then neutralized with 340 parts of isobutyric acid.

The paste thus obtained is converted into a paste of 10 per cent strength by thoroughly stirring it with twice its weight of sodium cymene sulfonate and glycerine calculated on the weight of the content of the effective vat dyestuff product, and with water.

220 parts of this paste are printed in manner indicated in Example 1. The print has properties similar to those of the print described in Example 1.

Instead of using the vat dyestuff derivative obtained as described above, there may be used an analogously obtained vat dyestuff derivative which, however, instead of being neutralized with isobutyric acid, has been mixed with an equivalent quantity of another acid, for example sulfuric acid, hydrochloric acid, phosphoric acid, especially with an acid the alkali salts of which are hydrotropic for instance benzenesulfonic acid, naphthalenesulfonic acids, toluenesulfonic acids, phthalic acid mono-esters of alcohols of high molecular weight, cymene-sulfonic acid, para-diethylaminobenzoic acid, anthraquinonesulfonic acids or the like. Moreover in the above example instead of the sodium cymenesulfonate and glycerine there may be used other generally known additions of hydrotropic character, for instance an alkali salt of the acids hereinbefore named and also further printing assistants, for instance a protective colloid, a fluxing agent, a bactericide agent, or such an addition may be made as a substitute for part of the sodium cymenesulfonate and glycerine.

Example 3

The neutralized reaction mixture obtainable as described in the first paragraph of Example 2 is stirred with 770 parts of sodium cymenesulfonate; the mass is then dried either in a vacuum or in an atomizer or in a heated kneading device or in a roller mill.

55 parts of the powder thus obtained are stirred well with 100 parts of sodium formaldehyde sulfoxylate, 245 parts of water and 600 parts of potash thickening made as described in Example 1; after standing for a long or short period this paste is printed as described in Example 1. The prints obtained with this powder are only slightly inferior in respect of strength to the corresponding prints with an analogous paste.

Instead of stirring the printing powder directly into the potash thickening, it may first be stirred with water to form a magma and only then incorporated in the potash thickening.

Example 4

40.6 parts of the dyestuff obtained by condensing 4:5-dichloro-7-methoxyisatin-α-chloride with 4-chloro-1-hydroxynaphthalene are made into a paste with 150 parts of caustic soda lye of about 30 per cent strength and water, and after addition of 11 parts of sodium hydrosulfite the whole is heated to 70-80° C. After the suspension has been stirred for a few minutes at this temperature it is cooled, filtered and the solid matter washed with water.

The quantity of the vat dyestuff derivative thus obtained corresponding with 20 parts of dry substance is ground to a paste of 10 per cent strength together with 20 parts of glycerine, 40 parts of sodium benzylaniline-sulfonate, 2 parts of crude cresol, 118 parts of water. For producing the paste the vat dyestuff derivative may be in moist condition, in which case the added proportion of water is diminished accordingly.

220 parts of this paste are stirred to form a paste with 600 parts of potash thickening described in Example 1, 100 parts of formaldehyde sulfoxylate and 80 parts of water, whereupon cotton is printed with the paste thus prepared. After drying the goods are steamed for 5 minutes in an air-free Mather-Platt apparatus at 102° C., then washed, developed and soaped at the boil. The print thus obtained is characterized by the strength and purity of its tone.

Example 5

220 parts of the paste obtained as described in Example 1, paragraph 1, are stirred for so long in the open that the black-brown color changes completely to orange, which is the case in a few hours. The paste is then stirred with 600 parts of the potash thickening described in Example 1 and printed as described in that example. The print obtained, as compared with a print of the unchanged new vat dyestuff derivative, has similar properties.

Example 6

The paste obtained as described in Example 2, paragraph 1, and neutralized with isobutyric acid is thoroughly stirred or ground to produce a paste of 10 per cent strength with 1000 parts of glycerine, 625 parts of sodium toluolsulfonate and water.

220 parts of such paste are stirred together with 600 parts of the cold potash thickening described in Example 1 and 100 parts of sodium formaldehyde sulfoxylate and 80 parts of water until a paste is produced.

After standing for a short or a long period this printing paste is printed on cotton and the goods are dried, steamed for 5 minutes in the air-free Mather-Platt apparatus at 102° C. and soaped at the boil. There is obtained a strong, pure and vivid print of a tint typical for 6:6'-diethoxy-thio-indigo.

Example 7

768 parts of 6:6'-diethoxy-thio-indigo and 1000 parts of glycerine, 625 parts of sodium benzenesulfonate, 1090 parts of caustic soda lye of 30 per cent strength and water are intimately ground together to form a paste of 12 per cent strength. 2000 parts of this paste are stirred or ground for one hour at 65—70° C. with 72 parts of sodium hydrosulfite of about 80 per cent strength. The brown-black paste thus obtained is neutralized at ordinary temperature with formic acid and made up into a total weight of 2400 parts with water; after a short time, which may be reduced by gently warming, the color of the paste passes to red-orange. 220 parts of the paste are printed as described in Example 6. The print obtained shows properties similar to those of the print described in Example 6.

In this example the formic acid may be exchanged for the equivalent quantity of another acid, for instance sulfuric acid, hydrochloric acid, phosphoric acid, especially an acid of which the alkali salts have hydrotropic properties, for instance benzene-sulfonic acid, a naphthalensulfonic acid, a toluenesulfonic acid, a phthalic acid mono-ester of an alcohol of high or of low molecular weight, cymenesulfonic acid, para-diethylaminobenzoic acid, benzylanilinesulfonic acid; prints having similar properties are obtained.

Also in the above example additions of sodium benzenesulfonate and glycerine may be exchanged wholly or in part for additions of other generally known hydrotropic bodies, for example an alkali salt of one of the above named acids, a protective colloid, a fluxing agent, a bactericide.

Example 8

336 parts of 2:1:2':1'-naphththio-indigo, 550 parts of sodium toluenesulfonate, 245 parts of caustic soda lye of 30 per cent strength, 210 parts of glycerine, 110 parts of sodium hydrosulfite of about 80 per cent strength and 1494 parts of water are ground together in a mill for one hour at ordinary temperature.

294.5 parts of this paste are mixed with 100 parts of sodium formaldehyde sulfoxylate, 5.5 parts of water and 600 parts of potash thickening described in Example 1, and the mixture is printed as described in Example 6.

The printing paste made in this manner, which may with advantage be further mixed with a fluxing agent, has a specially characteristic capacity for being fixed. The brown prints obtained are very pure, vivid and strong.

The dyestuff specified above can also be incorporated in the form of an aqueous paste with the printing paste.

Example 9

33.6 parts of 2:1:2':1'-naphththio-indigo, 55 parts of sodium toluenesulfonate, 24.3 parts of caustic soda lye, 21 parts of glycerine, 11 parts of sodium hydrosulfite, 154.9 parts of water and 600 parts of potash thickening described in Example 1 are intimately mixed together at ordinary temperature and then the mixture is allowed to stand for 30 minutes. There are then stiller in 100 parts of sodium formaldehyde sulfoxylate and the printing paste thus obtained, to which a fluxing agent may be added with advantage, is allowed to stand for a long or short time and then printed as described in Example 6. The prints obtained exhibit properties similar to those of the prints described in Example 8.

Example 10

420 parts of Ciba Yellow G (Color Index No. 1196), 500 parts of glycerine, 225 parts of caustic soda lye of 30 per cent strength, 750 parts of sodium cymenesulfonate, 10 parts of cresol and 1430 parts of water are together intimately ground in a mill.

1700 parts of this paste, 56 parts of sodium hydrosulfite of about 80 per cent strength and 794 parts of water are ground together for 4 hours at 65–70° C. The paste thus obtained contains 8.4 percent of dyestuff.

300 parts of this paste are mixed with 600 parts of the potash thickening described in Example 1, 100 parts of sodium formaldehyde sulfoxylate and the mixture is printed as described in Example 6. The yellow print obtained is pure and strong.

Example 11

4096 parts of a commercial paste conc. of 22 per cent strength of dimethoxydibenzanthrone (Color Index No. 1101) are concentrated by pressing to 2079 parts and then intimately ground with 2300 parts of glycerine. The paste obtained contains 20.5 per cent of dyestuff.

363 parts of this paste are intimately mixed for 6 hours at 45–50° C. with 78 parts of sodium cymenesulfonate, 56 parts of caustic soda lye of 30 per cent strength, and 25 parts of sodium hydrosulfite. The paste thus obtained contains 14.27 per cent of dyestuff.

200 parts of the paste thus obtained are mixed with 700 parts of potash thickening described in Example 1 and 100 parts of sodium formaldehyde sulfoxylate, and the mixture is printed as described in Example 6. The green print obtained is strong, pure and vivid.

Example 12

Into a solution, made with aid of heat in an atmosphere of hydrogen and filtered, of 16 parts of leuco-6:6'-diethoxy-thio-indigo in a mixture of 400 parts of alcohol, 450 parts of water and 35 parts of caustic soda lye of 30° Bé. is introduced a suspension made by grinding 8 parts of 6:6'-diethoxy-thio-indigo with 80 parts of alcohol, and the whole is mixed with 190 parts of caustic soda lye of 30° Bé. There is immediately formed a dark brown addition product. After stirring for ½ hour in an atmosphere of hydrogen at 65–70° the mass is cooled to about 20° C. filtered and the solid matter is washed for removing excess of leuco-compound, which has not entered into the reaction with much water which has been boiled with passage of hydrogen, and then cooled. There is thus obtained a wet cake containing about 16 parts of the dark brown quinhydrone. Finally, the mass is washed with some diluted hydrochloric acid and then stirred with a mixture of 130 cc. of water and 20 cc. of hydrochloric acid of about 10 per cent strength over night in an atmosphere of hydrogen at about 80° C.; the color is thus lightened.

After filtering and washing out the acid, the wet material is converted by means of 16 parts of glycerine, 24 parts of sodium benzenesulfonate and 1 part of the necessary quantity of water into a paste of 10 per cent strength.

285 parts of this paste are mixed with 615 parts of the potash thickening described in Example 1 and 100 parts of sodium formaldehyde sulfoxylate and the mixture is printed as described in the last paragraph of Example 1. There are obtained strong and pure orange prints.

The expression quinhydrone-like derivatives of vat dyestuffs as used in the following claims is to be understood to mean products built up from molecules of vat dyestuffs and their leuco compounds, which products represent defined compounds constituting an intermediate stage between vat dyestuffs and leuco compounds differing from the vat dyestuffs as well as from their leuco compounds.

What we claim is:

1. Process for producing vat dyestuff prints, comprising printing textile products with printing pastes which contain quinhydrone-like derivatives of vat dyestuffs, said quinhydrone-like derivatives being built up of molecules of vat dyestuffs and their leuco compounds and being definite compounds representing an intermediate stage between vat dyestuffs and leuco compounds corresponding to that obtained by reacting equimolecular proportions of the dyestuffs and leuco compounds and differing from the vat dyestuffs as well as from the leuco compounds.

2. Process for producing vat dyestuff prints, comprising printing textile products with printing pastes which contain conversion products of quinhydrone-like derivatives of vat dyestuffs, which are obtained by reaction of quinhydrones with at least one of the following agents: acids and oxidizing agents, said quinhydrone-like derivatives being built up of molecules of vat dyestuffs and their leuco compounds and being definite compounds representing an intermediate stage between vat dyestuffs and leuco compounds corresponding to that obtained by reacting equimolecular proportions of the dyestuffs and leuco compounds and differing from the vat dyestuffs as well as from the leuco compounds.

3. Process for producing vat dyestuff prints, comprising printing textile products with printing pastes which contain conversion products of quinhydrone-like derivatives of vat dyestuffs which are obtained by reaction of quinhydrones containing chemically combined alkali with acids, said quinhydrone-like derivatives being built up of molecules of vat dyestuffs and their leuco compounds and being definite compounds representing an intermediate stage between vat dyestuffs and leuco compounds corresponding to that obtained by reacting equimolecular proportions of the dyestuffs and leuco compounds and differing from the vat dyestuffs as well as from the leuco compounds.

4. Process for producing vat dyestuff prints, comprising printing textile products with printing pastes which contain quinhydrone-like derivatives of vat dyestuffs which have been produced in the printing paste, said quinhydrone-like derivatives being built up of molecules of vat dyestuffs and their leuco compounds and being definite compounds representing an intermediate stage between vat dyestuffs and leuco compounds corresponding to that obtained by reacting equimolecular proportions of the dyestuffs and leuco compounds and differing from the vat dyestuffs as well as from the leuco compounds.

5. Process for producing vat dyestuff prints, comprising printing textile products with printing pastes which contain quinhydrone-like derivatives of indigoid vat dyestuffs, said quinohydrone-like derivatives being built up of molecules of vat dyestuffs and their leuco compounds and being definite compounds representing an intermediate stage between vat dyestuffs and leuco compounds corresponding to that obtained by reacting equimolecular proportions of the dyestuffs and leuco compounds and differing from the vat dyestuffs as well as from the leuco compounds.

6. Process for producing vat dyestuff prints, comprising printing textile products with printing pastes which contain quinhydrone-like derivatives of thioindigoid vat dyestuffs, said quinhydrone-like derivatives being built up of molecules of vat dyestuffs and their leuco compounds and being definite compounds representing an intermediate stage between vat dyestuffs and leuco compounds corresponding to that obtained by reacting equimolecular proportions of the dyestuffs and leuco compounds and differing from the vat dyestuffs as well as from the leuco compounds.

7. Process for producing vat dyestuff prints, comprising printing textile products with printing pastes which contain quinhydrone-like derivatives of 6:6'-diethoxy-thio-indigo, said quinhydrone-like derivatives being built up of molecules of the vat dyestuffs and its leuco compound and being definite compounds representing an intermediate stage between vat dyestuff and leuco compound corresponding to that obtained by reacting equimolecular proportions of the dyestuff and the leuco compound and differing from both of these.

8. Process for producing vat dyestuff prints, comprising printing textile products with printing pastes which contain quinhydrone-like derivatives of 4:5:4':5'-dibenzo-thio-indigo, said quinhydrone-like derivatives being built up of molecules of the vat dyestuffs and its leuco compound and being definite compounds representing an intermediate stage between vat dyestuff and leuco compound corresponding to that obtained by reacting equimolecular proportions of the dyestuff and the leuco compound and differing from both of these.

EDUARD KAMBLI.
ERNST STOECKLIN.
RICHARD TOBLER.